UNITED STATES PATENT OFFICE.

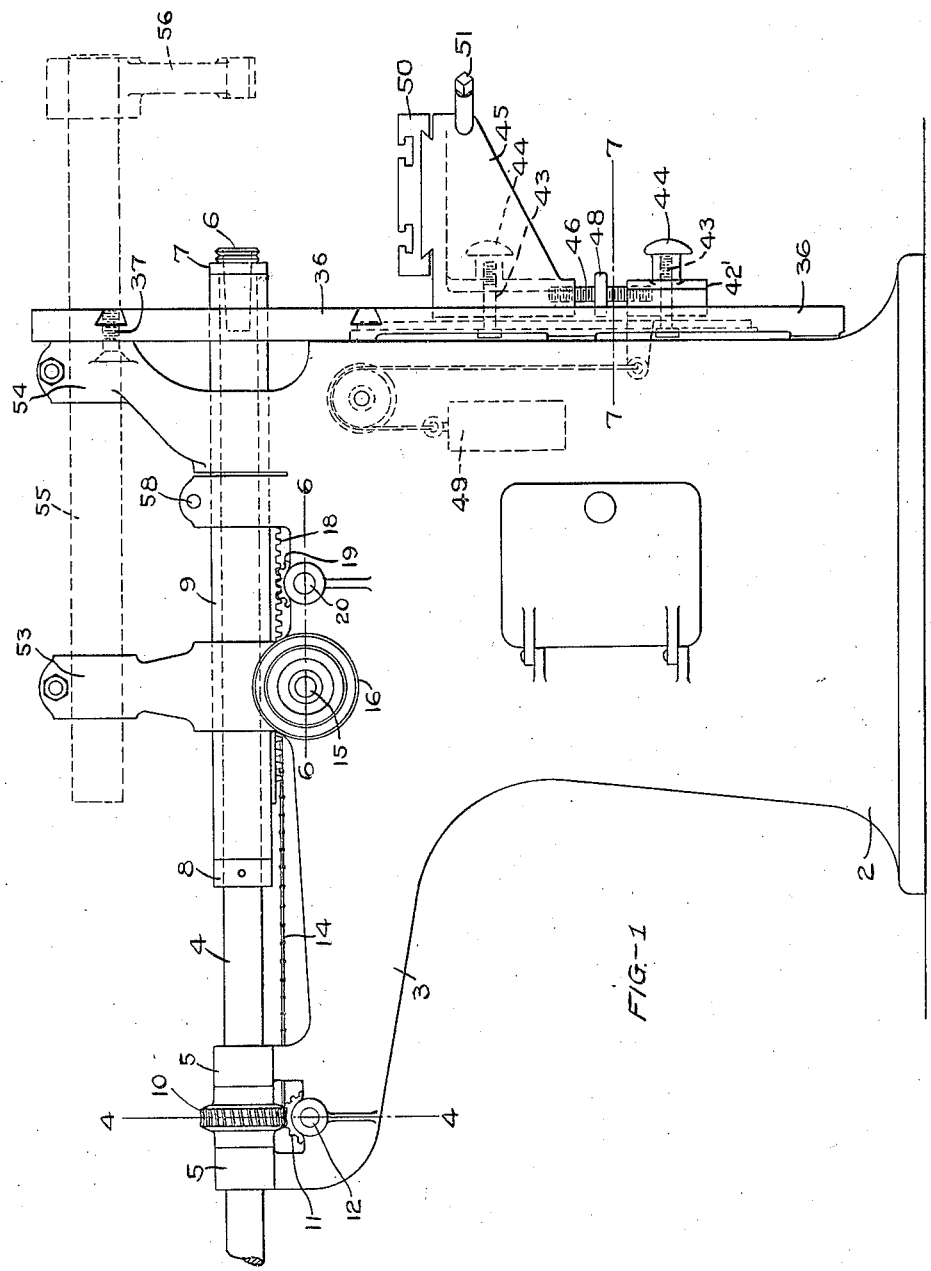

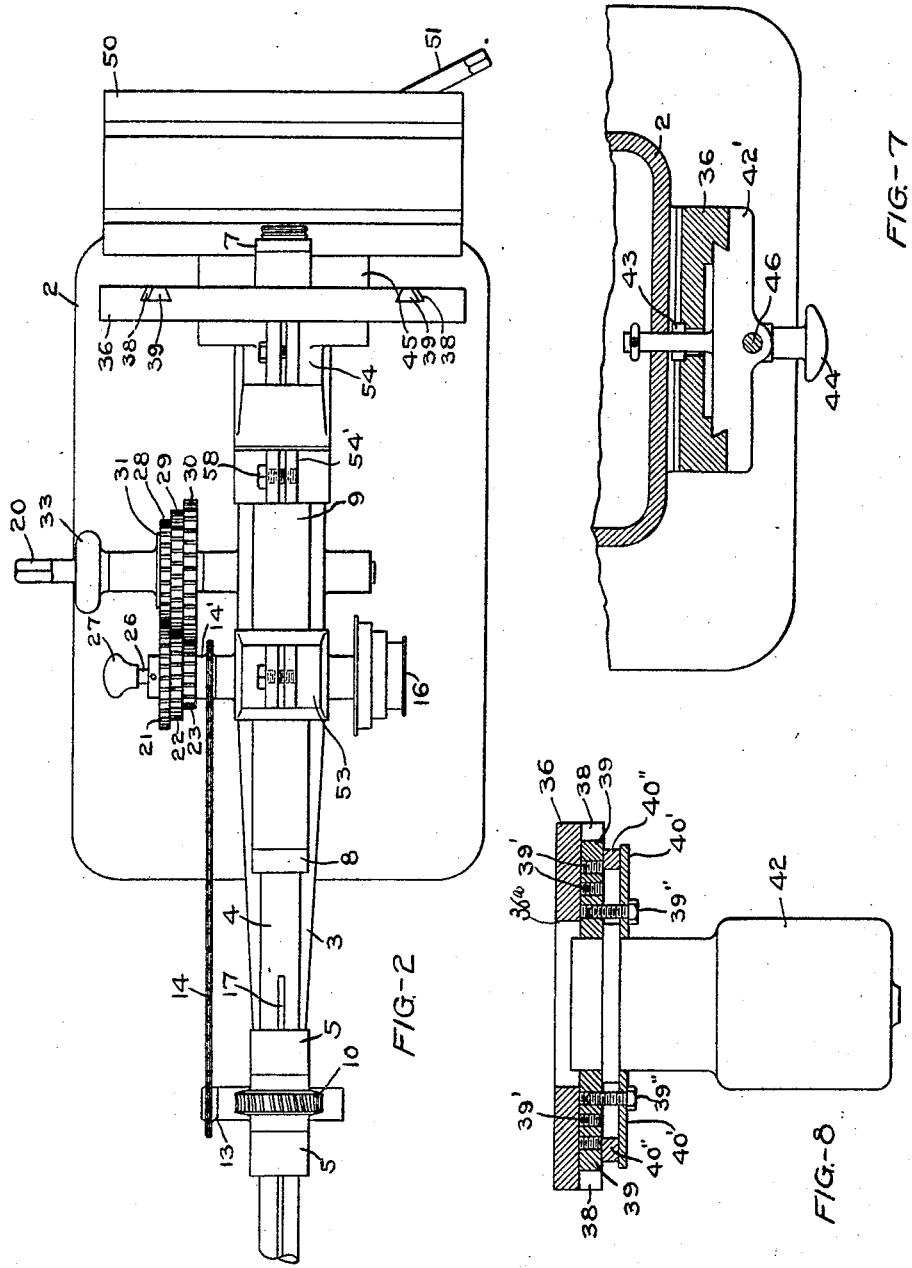

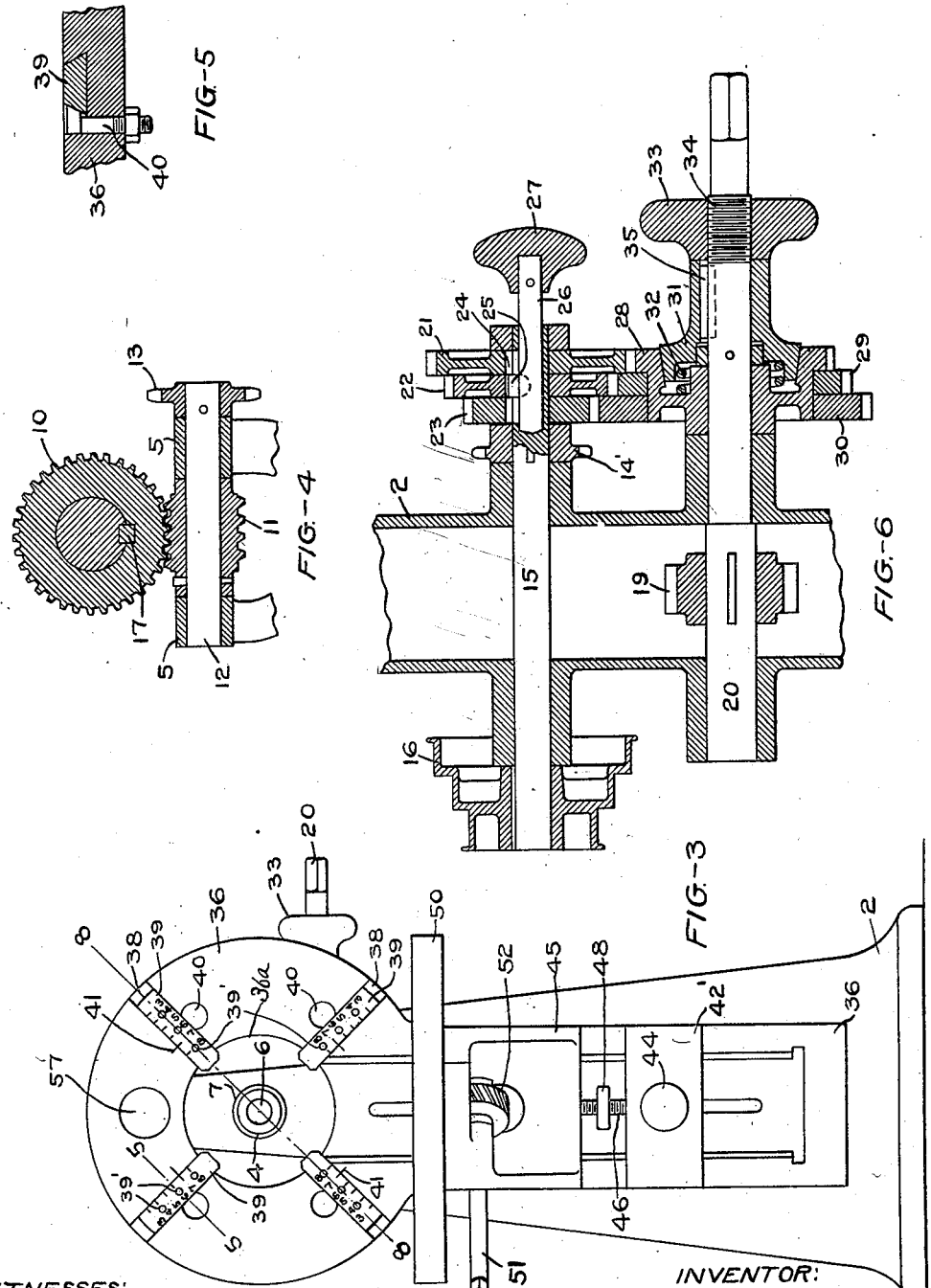

GUSTAVE F. KRIESEL, OF MINNEAPOLIS, MINNESOTA, ASSIGNOR, BY MESNE ASSIGNMENTS, TO ESTHER V. SAFSTROM, OF MINNEAPOLIS, MINNESOTA.

BORING AND MILLING MACHINE.

1,369,749.  Specification of Letters Patent.  Patented Feb. 22, 1921.

Application filed May 10, 1917. Serial No. 167,819.

*To all whom it may concern:*

Be it known that I, GUSTAVE F. KRIESEL, a citizen of the United States, resident of Minneapolis, county of Hennepin, State of Minnesota, have invented certain new and useful Improvements in Boring and Milling Machines, of which the following is a specification.

My invention relates to machines adapted for boring and milling purposes and the object of the invention is to provide a compact, inexpensive machine of this character which not only may be used for reboring gas engine cylinders and the like or for milling purposes, but is also adapted for cutting gears, key-seats and square shafts.

A further object is to provide a machine having a comparatively wide range of usefulness which will take the place of a lathe for many classes of work and be much more economical in its first cost and operation.

The invention consists generally in various constructions and combinations, all as hereinafter described and particularly pointed out in the claims.

In the accompanying drawings forming part of this specification,

Figure 1 is a side elevation of a boring and milling machine embodying my invention, Fig. 2 is a plan view of the same, Fig. 3 is an end view, Fig. 4 is a sectional view on the line 4—4 of Fig. 1, Fig. 5 is a sectional view on the line 5—5 of Fig. 3, Fig. 6 is a sectional view on the line 6—6 of Fig. 1, Fig. 7 is a sectional view on the line 7—7 of Fig. 1, Fig. 8 is a sectional view on the line 8—8 of Fig. 3, showing the means for fastening the cylinder in place.

In the drawing, 2 represents the base of the machine, having a horizontally projecting bracket 3 at the rear thereof. 4 is a shaft, journaled in bearings 5 on said bracket and extending horizontally over the base of the machine and having at one end a suitable socket 6 to receive a boring or other tool. A flange 7 is formed on said shaft and a collar 8 is secured thereon between which and said flange I arrange a sleeve 9, said shaft being mounted to revolve independently of the sleeve. A worm wheel 10 is mounted on said shaft and meshes with a worm 11 secured on a shaft 12 that is provided with a sprocket wheel 13 and is driven through a belt 14 and a sprocket 14' from the driving shaft 15 having a pulley 16 mounted thereon. The revolution of the shaft 4 operates the boring or other tool, the shaft sliding in its bearing by means of the key-seat and key at 17 to allow for the forward or backward movement of the shaft to adjust the tool to the work.

For feeding the shaft, the sleeve 9 has a rack 18 on the underside which meshes with a gear 19 on the shaft 20 and the shafts 15 and 20 are provided with a variable speed gearing by means of which the operator can feed the tool to the work at any desired speed. This variable speed gearing consists preferably of a series of gears 21, 22 and 23, loosely mounted on the shaft 15 and having key-seats 24 therein to receive a key 25 mounted in a stud 26 that is provided with a finger grip 27. The gears are normally loose on the shaft, but may be locked thereon by the adjustment of the key. A gear 28 is mounted on the shaft 20 and provided with gear rings 29 and 30 mounted on the hub of the gear 28. A clutch 31 has a friction surface for engaging the gear 28 against the tension of a spring 32, a finger grip 33 being provided, having threaded engagement at 34 with the shaft 20. The clutch 31 has a key-seat at 35 in said shaft. By this mechanism power may be transmitted from the shaft 15 through either of the gears 21, 22 or 23 to the gears of the shaft 20 for operating the gear 19 at a variable speed to feed the boring or other tool to the work.

On the vertical end face of the machine I provide a plate 36 secured by suitable means, such as cap screws 37, which are inserted through the end wall of the base into the plate. This plate is preferably provided with a circular upper portion with dove-tailed slots 38 radiating from a comparatively large orifice 36ª in the center thereof. In these slots dove-tailed bars 39 are mounted and adjustably secured therein by bolts 40. These bars have graduations thereon opposite the mark or graduation 41 at the edges of the slots and by adjusting these bars toward and from the center of the plate, the engine cylinder 42 or other article to be bored may be properly centered in the machine. The shaft and sleeve are fed forward to project the tool carrier into and through the orifice to a point where the tools can engage the work clamped to the face of the plate. Whenever desired, the sleeve may be retracted, withdrawing the tool carrier through the orifice to a point in the rear of the plate, where the carrier can be conveniently reached to change the tools or re-adjust them or to remove the carrier and substitute another therefor, all without the necessity of disturbing the cylinder or other piece of work which may be secured to the face of the plate. In this way I avoid re-centering and re-alining of the work in case it should be desired to change the tool or carrier during the progress of the work.

The bars 39 are provided with threaded sockets 39' to receive bolts 39'' which pass through bars 40' having one end to engage the flange on the cylinder 42 and their opposite end seated on blocks 40'' which rest on the bars 39. By this means a cylinder may be clamped securely on the plate 36 and may be centered thereon by the radial adjustment of the blocks 39.

The plate 36 extends downwardly to the lower portion of the base and a bracket 42' is mounted in guides therein and held by a bolt 43 having a thumb nut 44. A table 45 is mounted in similar guides above said bracket and supported by similar means on the plate 36 and between said bracket and table is a bolt 46 having its ends tapped into the bracket and table and provided with a hand grip 48 by means of which the table may be raised or lowered with respect to the bracket. Within the base a counter-balance 49 is preferably provided, connected with the bracket for balancing the load thereon when the bolts are loosened. A carriage 50 for the work to be milled or machined is mounted on the table 45 and moved back and forth thereon through the operation of the shaft 51 and worm 52.

On the top of the frame of the machine I provide clamps 53 and 54 wherein a shaft 55 indicated by dotted lines in Fig. 1, having a depending arm 56, is mounted for use when the machine is employed in milling purposes. The plate 36 is provided with an orifice 57 to receive this shaft, the end of which overhangs the table 45 and supports the socket in the arm 56 concentric with the shaft 4. A clamp 58 is provided for gripping the sleeve 9 and holding it against longitudinal movement and feeding the shaft 4 when the milling tool is mounted therein.

I claim as my invention:

1. The combination, with a frame, of a plate vertically mounted thereon and having an orifice therein, means for supporting a piece of work horizontally against said plate in front of said orifice, a shaft horizontally mounted in said frame and having a tool carrier, means for revolving said shaft and means mounted for rapid forward and backward movement in said frame and having bearings for said shaft for advancing and retracting it and said tool carrier through said orifice.

2. The combination, with a frame, of a work-supporting member mounted thereon, a feed shaft operating through an orifice in said member, means for revolving and feeding said shaft, and a table mounted for vertical and horizontal adjustment with respect to said member.

3. The combination, with a frame, of a work-supporting member mounted in a vertical plane thereon and having an orifice therein, a feed shaft operating through said orifice and provided with a tool holder, means for revolving and feeding said shaft through said orifice and a table mounted beneath said member and vertically adjustable with respect thereto.

4. The combination, with a frame, of a work-supporting member mounted thereon, a feed shaft operating through an orifice in said member, means for revolving and feeding said shaft, a table vertically adjustable with respect to said member, and a carriage mounted for adjustment on said table.

5. The combination, with a frame, of a plate mounted thereon and having a central orifice, a tool-carrying shaft operating through said orifice, radially moving clamps for centering the work with respect to said orifice, said plate having a hole therein above said orifice, said frame having clamps with bearings therein in alinement with the hole in said plate to receive a shaft, and a milling tool supporting arm.

6. The combination, with a frame, of a driving shaft transversely mounted therein and having a driving pulley at one end, a driven shaft also transversely mounted in said frame and having a variable speed driving connection with said driving shaft, a feed shaft mounted in said frame transversely of said driving shaft and having a driving connection therewith for revolving said feed shaft, a driving connection between said driving shaft and said feed shaft for feeding it to the work, and means for supporting a piece of work in the path of said feed shaft.

7. The combination, with a frame, of a stationary plate mounted thereon, radially movable clamps for engaging and securing the work on said plate, a shaft operating through said plate for supporting a tool, means for simultaneously revolving and feeding said shaft, and a table adjustably supported beneath and adjacent said shaft.

8. The combination, with a frame, of a work-supporting plate mounted thereon, a feed shaft operating through said plate, means for revolving and feeding said shaft, and a table mounted on said plate and vertically adjustable thereon toward and from said shaft.

9. The combination, with a frame, of a plate mounted thereon and having an orifice therein, means for centering an engine cylinder with respect to said orifice, a shaft mounted for rotary and longitudinal movement through said orifice, a sleeve encircling said shaft and having means for feeding it lengthwise during its rotary movement, and means for clamping said sleeve to lock it while permitting independent rotary movement of said shaft.

10. The combination, with a frame, of a work-supporting member mounted therein and provided with an orifice, means for centering the work with respect to said orifice, a shaft provided with a tool carrier, means for revolving said shaft, a sleeve through which said shaft projects, means preventing independent movement of said sleeve on said shaft, and mechanism for feeding said sleeve to advance or retract said shaft and tool carrier through said orifice.

11. The combination, with a frame, of a work-supporting member mounted thereon and provided with an orifice, a shaft having a tool carrier mounted to project through said orifice, means for revolving and feeding said shaft, means for supporting the work on said member, and a milling tool support provided above the orifice in said member.

12. The combination, with a frame, of a plate vertically mounted thereon, a work-supporting table vertically adjustable on the face of said plate, the upper portion of said plate above said table having an orifice therein for receiving the operating shaft of a milling tool.

13. The combination, with a frame, of a work-supporting member mounted thereon, a feed shaft operating through said member, means for revolving and feeding said shaft, a table vertically adjustable with respect to said shaft and orifice, and a milling tool support provided above said orifice.

14. The combination, with a frame, of a plate mounted thereon and having an orifice therein, a tool carrying shaft operating through said orifice, means for centering the work with respect to said orifice, said plate having a holder therein above said orifice, said frame having bearings in alinement with said holder to receive a shaft and a milling tool supporting arm.

15. The combination, with a frame, of a work-supporting member mounted thereon and having an orifice therein, a feed shaft provided with a tool carrier operating through said orifice, said member having means for mounting a piece of work thereon, and a shaft mounted in said frame above said orifice and projecting through said member parallel with said tool supporting shaft.

16. The combination, with a frame, of a work-supporting member mounted thereon and having an orifice and a series of radial grooves around said orifice, clamps adjustably mounted in said grooves, the work being seated against the surface of said member around said orifice and held by said clamps, a feed shaft operating through said orifice and provided with a tool carrier, means for revolving said shaft, and means having a bearing therein for said shaft for feeding and retracting it, said orifice being of sufficient size to allow said tool carrier to be projected and retracted therethrough, the tools being accessible in the rear of said orifice.

17. The combination, with a frame, of an upright plate secured thereon and provided with a central orifice, a tool supporting shaft horizontally mounted to project through said orifice, means for revolving said shaft and means having a longitudinal movement in said frame and a bearing therein for said shaft for feeding and retracting it, means provided in the face of said plate around said orifice for clamping the work thereon, the work being seated against the face of the plate and engaged by said clamping means, the tools carried by said shaft being projected and retracted through said orifice and accessible at the rear of said plate.

18. The combination, with a frame, of a plate mounted thereon and having an opening and a surface against which a piece of work to be bored is clamped encircling said opening, a sleeve mounted in said frame, a shaft mounted in said sleeve and having means for supporting a tool to engage the work through said opening, means for feeding said sleeve and shaft, and means for revolving said shaft in said sleeve.

19. The combination, with a frame, of a plate having an opening therein and a surface around said opening against which a cylinder to be bored is clamped, a sleeve mounted in said frame for forward and backward movement, a shaft mounted in said sleeve and having a tool support to project through the opening in said plate, means for feeding said sleeve and shaft to the work and revolving said shaft in said sleeve, said tool being accessible in the rear of said plate when said sleeve and shaft are retracted without changing the position of the work on said plate.

20. The combination, with a frame, of a plate mounted thereon and having an opening therein and means for clamping the work against said plate encircling said opening, a sleeve mounted in said frame, a feed mechanism for said sleeve having means for operating it by power or manually, a shaft mounted in said sleeve and means for revolving it therein independently of its forward feeding movement, said shaft having means for supporting a tool for engaging the work through the opening in said plate.

21. The combination, with a frame, of a work-supporting member mounted thereon and having a comparatively large orifice therein, work-engaging clamps mounted around said orifice for clamping the work against the face of said member so that the work will be accessible through said orifice from the other side of said member, a feed shaft operating through said orifice and provided with a tool carrier, means having a forward and backward movement in said frame and a bearing for said shaft for feeding said shaft and carrier through said orifice to the work and retracting said shaft and carrier from said member and orifice for convenient access to said carrier on the opposite side of said member from the work.

22. The combination, with a frame, of a driving shaft mounted therein, a driven shaft mounted in said frame and having a variable speed driving connection with said driving shaft, a feed shaft mounted in said frame transversely of said driving shaft and having a driving connection therewith for revolving said feed shaft, driving connections between said driving shaft and said feed shaft for feeding it to the work, and means for supporting a piece of work in the path of said feed shaft.

23. The combination, with a frame, of a plate vertically mounted thereon and having an orifice therein, means for supporting a piece of work horizontally against said plate in front of said orifice, a shaft horizontally mounted in said frame and having a tool carrier, a sleeve having bearings therein for said shaft, means for feeding said sleeve and shaft toward said orifice and withdrawing them, a driven shaft mounted transversely of said sleeve and having a driving connection therewith, a variable speed gearing connecting said driving shaft with said driven shaft, mechanism for revolving said feed shaft, and a driving connection between said driving shaft and said feed mechanism.

24. The combination, with a frame, of a plate mounted thereon and having an opening and a surface against which a piece of work to be bored is clamped encircling said opening, a sleeve mounted to reciprocate in said frame toward and from said opening, a shaft mounted in said sleeve and having means for supporting a tool to engage the work through said opening, and power operated means for simultaneously revolving said shaft in said sleeve and feeding said sleeve to advance said shaft and the tool carried thereby to the work.

25. The combination, with a frame having an orifice therein and means for supporting a piece of work in front of said orifice, of a shaft mounted in said frame and having a tool carrier, means for revolving said shaft and carrier and means mounted for forward and backward movement in said frame and having bearings for said shaft for advancing and retracting it and said tool carrier through said orifice.

26. The combination, with a frame and means for clamping a piece of work thereon, of a shaft having a tool carrying head, means for revolving said shaft to feed the tools to the work, means having bearings for said shaft and mounted for forward and backward movement, and means for reciprocating said shaft-supporting means to advance and retract said shaft.

27. The combination, with a frame and an upright plate mounted thereon and having an orifice therein and a true seating surface around said orifice, and clamps for securing a piece of work to said surface, of a shaft having a tool-carrying head, means for feeding said shaft and tools forward through said orifice to engage the work and retracting them from the work, and means for revolving said shaft and tools.

In witness whereof, I have hereunto set my hand this 5th day of May, 1917.

GUSTAVE F. KRIESEL.